Nov. 13, 1956 G. W. KELLY 2,770,011
DIE CONSTRUCTION FOR INJECTION-TYPE MOLDING MACHINES
Filed Dec. 15, 1951 4 Sheets-Sheet 1

INVENTOR
George W. Kelly
BY *M. S. McDowell*
ATTORNEY

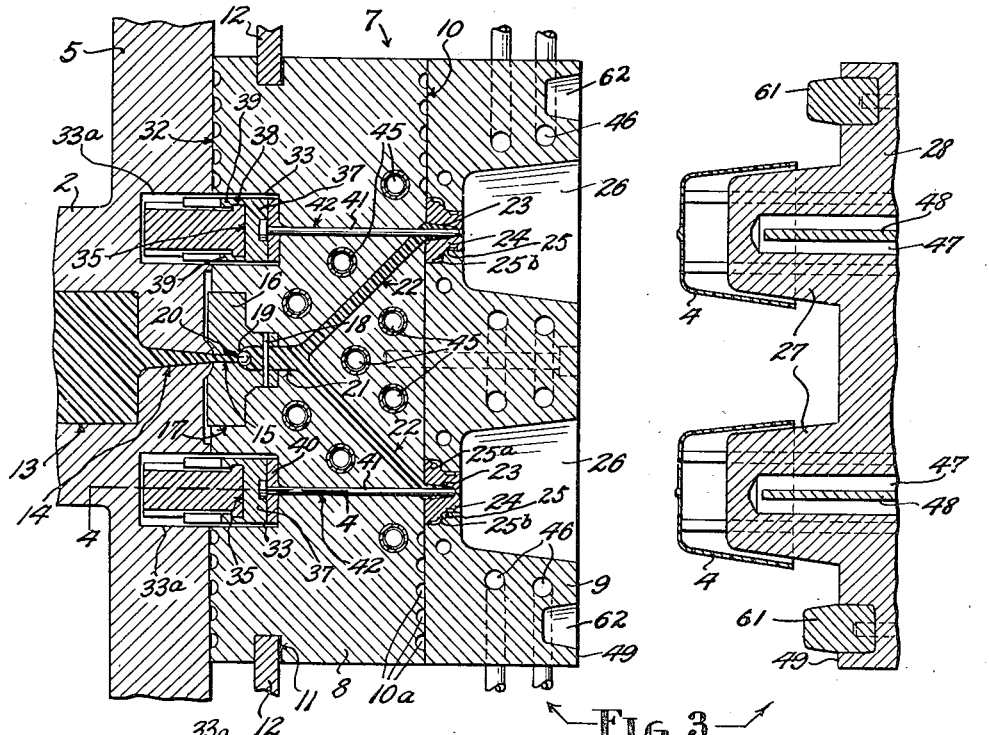

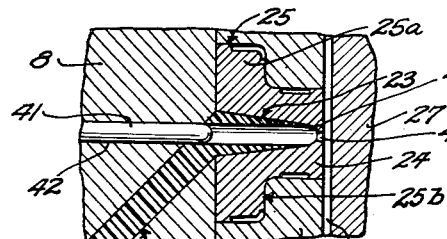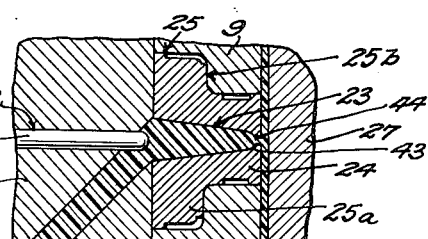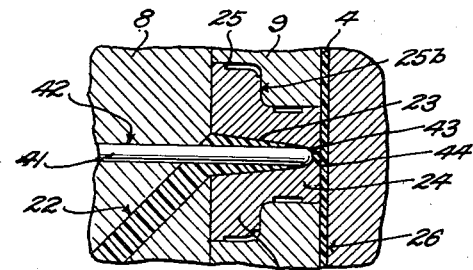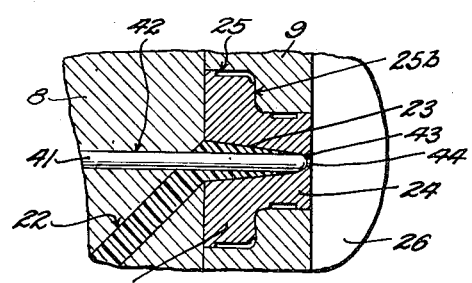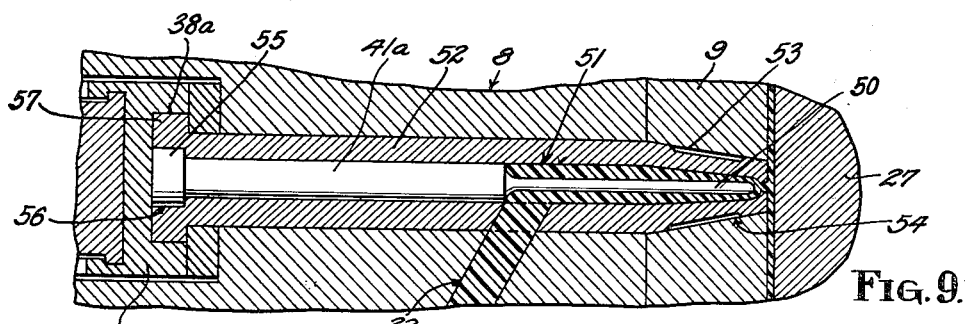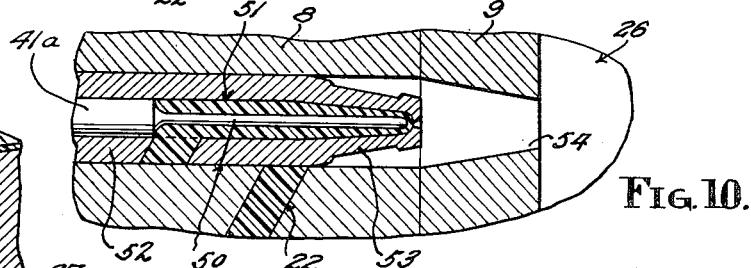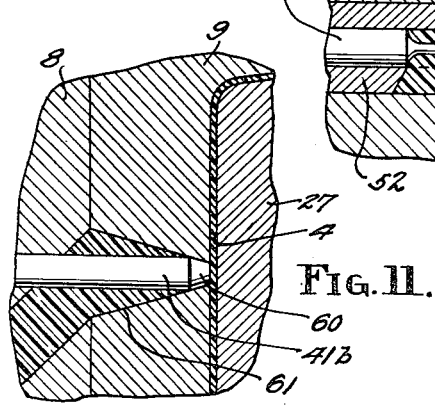

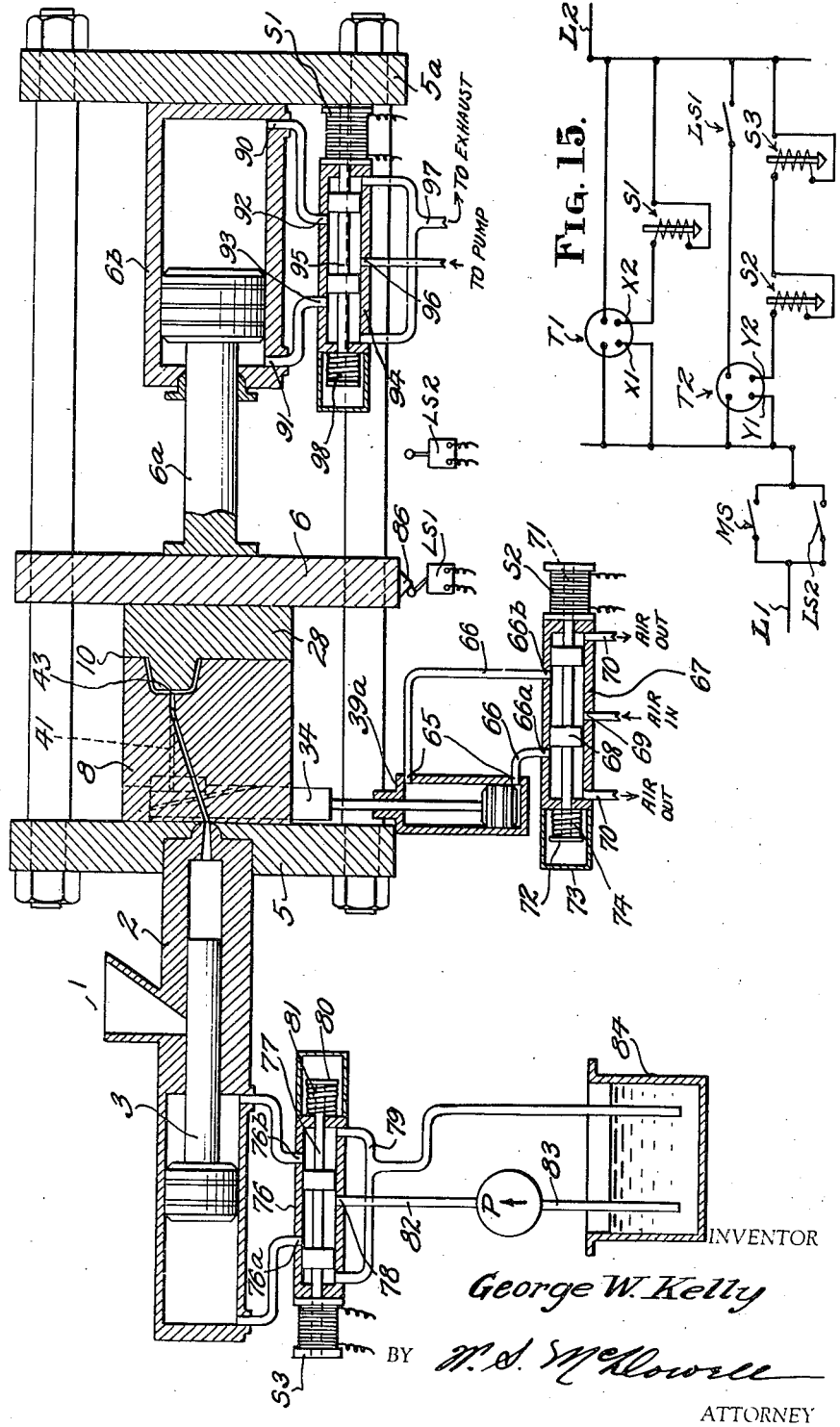

United States Patent Office 2,770,011
Patented Nov. 13, 1956

2,770,011

DIE CONSTRUCTION FOR INJECTION-TYPE MOLDING MACHINES

George W. Kelly, Columbus, Ohio, assignor to Columbus Plastic Products, Inc., Columbus, Ohio, a corporation of Ohio Application December 15, 1951, Serial No. 261,871

3 Claims. (Cl. 18—30)

This invention relates to molding apparatus and, more particularly, to molding apparatus of the injection type for use in the manufacture of hollow molded articles composed of thermosetting or thermoplastic synthetic resins.

Such molding apparatus, as now ordinarily constructed for the manufacture of said articles, provides means by which the resins, while in a heated formative state, are advanced under pressure through communicating sprue passages to spaced molding cavities of a mold composed of partible sections and in which said articles are formed. Customarily, such molds comprise separable sprue, cavity and core sections held in closely adjoining relationship between stationary and movable platens of the apparatus. The sprue and cavity sections of the mold contain the sprue passages through which the heated plastic materials are forced under ram-developed pressures. These passages normally diverge from a common pressure chamber outlet in a manner forming a multiplicity of individual passages, one of which leads to an end of each of the article-molding cavities. After a given molding operation, in which the heated plastic material forced into each cavity is allowed to set, cure or harden to produce articles of definite shapes, the mold sections are separated to provide for the withdrawal of the molded articles from the cavities of the cavity section and their removal as a formed product from the apparatus.

As presently constructed, the sprue passages leading to the molding cavities, cause the material contained therein to form on such articles extensions known as sprue runners. This runner material must be broken off, cut or otherwise removed from the articles after the latter have been withdrawn from the mold. It is not uncommon in such runner-removing operations for the articles or ware to become cracked, marred or broken in their regions of joinder with the runners.

It is an object of the invention to provide sectional molds for use in the formation of articles cast from synthetic resins which are so formed as to provide an improvement upon prior molds employed for this purpose.

Another object of the invention is to provide a sectional mold construction for the casting of articles composed of synthetic resins and wherein the molds are of such construction that the plastic articles formed therein will be devoid of sprue runners or molding continuations when removed from the mold.

A further object of the invention is to provide molding apparatus of the pressure-injection type in which improved movable valve or plunger means are provided for closing the restricted ports or passages by which heated synthetic resins are delivered under pressure to the end regions of molding cavities of the apparatus, whereby to arrest delivery of the plastic material to the cavities prior to separating the mold sections in withdrawing finished ware therefrom.

A still further object of the invention is to arrange the movable valve or plunger mechanism of the apparatus in such relation to the resin-delivering sprue passages and the molding cavities so that the closing off of said passages to plastic flow thereby will be performed in a manner eliminating the presence of sprue runners, or other similar protrusions or extensions on the formed articles.

Another object is to provide means of this character by which the plastic material contained in the sprue passages during periods of closure of the valve mechanism is maintained in a heated flowable condition for introduction into the mold cavities immediately upon the opening of the valve mechanism.

With these and other objects in view, which will appear as the description proceeds, the invention consists in the novel features of construction, combinations of elements and arrangements of parts, all hereinafter more fully described and pointed out in the appended claims.

In the accompanying drawings, forming a part of this specification, and in which similar characters of reference denote like and corresponding parts throughout the several views thereof:

Fig. 3 is a similar view, disclosing the core and cavity sections of the mold as separated, providing for the removal of formed articles from the apparatus. In this figure, the movable valve plungers of the present invention are disclosed in their seated positions shutting off the flow of plastic material to the molding cavities formed in the cavity section of the mold;

Fig. 4 is a detail sectional view taken through the sliding wedge means employed in actuating the valve plungers of the present invention, the plane of the figure being indicated by the line 4—4 of Fig. 3;

Fig. 5 is an enlarged detail sectional view disclosing one of the valve plungers in a retracted position admitting of the introduction of pressure-forced plastic material into a mold cavity;

Fig. 6 is a view similar to Fig. 5 with parts positioned to allow the operation of forcing the molten plastic material into an associated mold cavity;

Fig. 7 is a similar view setting forth the valve plunger in its closed or seated position arresting the flow of molten plastic material into the associated mold cavity, and with the plunger disposed so that it has severed the sprue-contained material from that which has been employed to produce the molded article;

Fig. 8 is a view similar to Fig. 7 disclosing the valve plunger in its seated position and omitting the core section of the mold and the article formed thereon;

Fig. 9 is a detail vertical longitudinal sectional view disclosing a modified form of valve plunger and illustrating the same in position admitting of the forcing of molten plastic material into an associated mold cavity;

Fig. 10 is a view similar to Fig. 9, but showing the valve plunger of that figure in a position arresting plastic flow to an associated mold cavity;

Fig. 11 is a vertical sectional view disclosing another modified form of valve plunger;

Fig. 12 is a diagrammatic view setting forth an arrangement of mold cavities and communicating sprue passages adaptable to the present invention;

Fig. 13 is a detail elevational view of the operating means used in the control of the sprue plungers;

Fig. 14 is a diagrammatic view of the present injection molding machine and the various control elements therefor;

Fig. 15 is a diagram of the electrical operating circuit for the injection ram and the sprue closing valve members of the present machine.

Figures 1, 2:
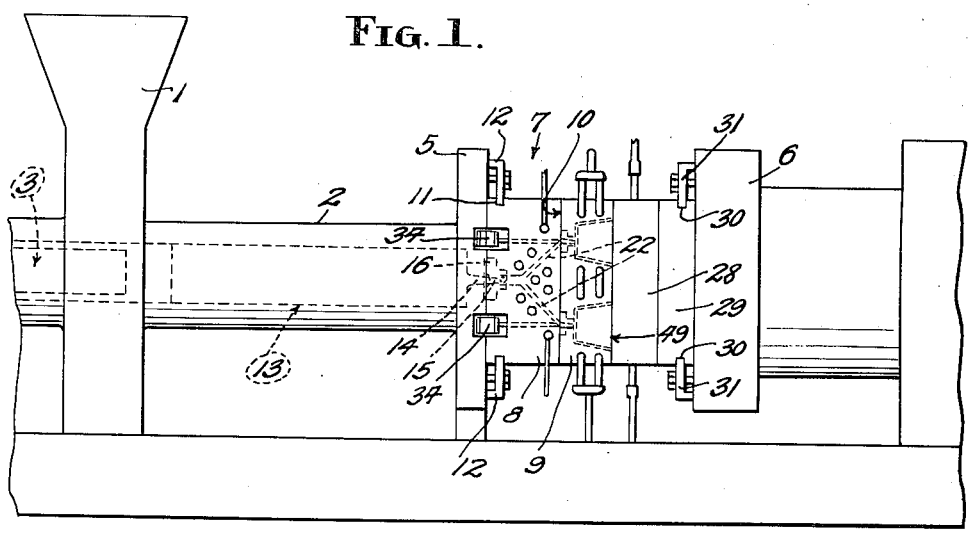
Fig. 1 is a view in side elevation of a pressure-injection molding machine formed in accordance with the present invention.
Fig. 2 is a detail vertical longitudinal sectional view taken through the separable mold sections of the apparatus and disclosing the same in their joined positions in the molding of articles.

The machine illustrated in Fig. 1 of the drawings is adapted for molding receptacles and other hollow articles from plastic material, such as thermosetting or thermoplastic synthetic resins. As usual, the latter may be supplied to the machine by way of a hopper or magazine 1 in granular form, and fed in measured quantities into a heating cylinder 2 which contains a reciprocatory ram, or other equivalent pressure device 3. In the cylinder 2, the resins are subjected to heating, and thereby converted from their normally solid to a formable plastic state adapted for pressure injection into mold activities, as in producing various types of hollow articles, such as the cups or drinking tumblers indicated at 4 in the drawings.

In this instance, the machine includes a stationary platen shown at 5 and a slidably movable platen indicated at 6, the latter being actuated by a fluid-pressure-responsive ram 6a for axial longitudinal movement toward and away from the stationary platen 5. A sectional mold structure indicated generally at 7 is carried by and arranged between these platens in axial longitudinal alignment therewith. It is particularly to the design of this mold structure that the present invention is directed.

As illustrated in a preferred embodiment of the invention shown in the drawings, the mold structure comprises sprue and cavity sections indicated at 8 and 9 in the drawings. In the use of the mold, these sections are firmly clamped together so that the same constitute, in effect, a unitary construction. However, the sections 8 and 9 may be separated along their parting surfaces 10. Such separation permits of the removal of a given cavity section from an associated sprue section, so that other cavity sections may be substituted for a first cavity section, enabling articles of different configurations to be molded without changing the sprue section. Preferably, the surface 10 of the sprue section is formed with parallel shallow grooves 10a, which facilitate alignment and separation of the sections. In this instance, the sprue section has been shown as being provided with recesses 11, which receive the inner edge portions of clamping dogs 12, the latter being carried by the stationary platen 5.

As shown particularly in Fig. 2 of the drawings, the heating cylinder 2 contains a pressure chamber 13 in which the molten plastic resins are contained under pressure exerted thereon by the fluid-actuated slidable ram 3. At its forward end, the chamber 13 terminates in a restricted outlet 14, which outlet is disposed in registry with an axial passage 15 present in a sprue bushing 16, the latter being removably positioned in a socket 17 formed in the sprue section 8 of the mold.

The passage 15 is enlarged in diameter intermediately of its length and is formed with a stop pin 18 for engagement with a ball check valve 19. When the ram 3 is moved in a forward direction, heated plastic material is displaced from the chamber 13 and is discharged therefrom by way of its outlet 14, entering the passage 15 of the bushing 16. As a result of the entry of the plastic material, the ball check valve is displaced from its normal seat 20 and is forced against the stop pin 18, allowing the molten plastic material to flow around the ball check valve in the larger diametered portion of the passageway 15 and to issue from the outlet of the latter into a central sprue passageway 21 formed in the sprue section 8 of the mold. The passageway 21 communicates, as shown in Figs. 2 and 12, with diverging branch passages 22 which lead to and terminate in registry with passages 23 provided in sprue bushings shown at 24, the latter being positioned in sockets 25 formed in the parting surface 10 of the cavity section 9. The bushings 24 are each constructed to include an enlarged outer head 25a which seats on an annular flange 25b forming a part of the socket 25, so that the bushings 24 can only be displaced longitudinally from their sockets when the sprue and cavity sections are relatively separated.

Formed in the cavity section of the mold structure are a plurality of article-forming cavities 26 which, normally, are adapted to be occupied by correspondingly formed but smaller core extensions 27 formed integrally with a movable core section 28 of the mold structure. The core section 28 includes a base 29 which is recessed as at 30 for the reception of fastening dogs 31 by which the core section is united in connection with the movable platen 6. Reciprocation of the platen 6 enables the core extensions 27 of the core section to enter and leave the cavities 26 of the cavity section 9 of said mold structure.

The sprue section 8 has the grooved face 32 thereof, which is arranged for engagement with the stationary platen 5, formed with transversely extending slots 33, the latter registering with corresponding slots 33a formed in the platen 5. Slidably positioned in these slots are longitudinally movable wedge bars 34. The sloping faces 35 of each of these bars is, as shown in Fig. 4, arranged for engagement with a complemental inclined face 36 of a valve-plunger-carrying head 37. Each of the heads 37 includes a slot 38 for the reception of an associated wedge bar 34, which slot is formed to receive ribs 39 formed with each of the heads 37. By reciprocating the wedge bars 34 through any suitable means longitudinally of the slots 33, reciprocatory movement may be imparted to the heads 37. Such reciprocating means may comprise the fluid cylinder and piston 39a of Fig. 13.

These heads are formed with face plates 40, which carry the headed inner ends of a plurality of valve-forming plungers or pins 41, the latter extending slidably in openings 42 provided in the sprue section and which openings at their outer ends communicate with the openings in the sprue bushings 24. The ends of the plungers or pins, as shown more particularly in Figs. 7 and 8, are adapted to engage with seats 43 provided in the entrance wall surfaces of restricted ports 44 through which plastic material travels under ram pressure when entering the cavities 26 of the mold section 9. The plungers or pins may have their forward ends removed from engagement with the seats 43 through the actuation of the wedge bars 34 and the heads 37 joined therewith, as disclosed particularly in Figs. 5 and 6.

In the operation of the machine, heated plastic resins, in a more or less molten or fluidic state, are advanced by the action of the ram 3 from the pressure chamber 13 of the cylinder 2 into the passage 15 of the axial sprue bushing 16. With the ram 3 moving in a material-advancing direction, the ball-check valve 19 in the passage 21 is unseated, so that the molten plastic material may pass around the ball-check valve and thence into the diverging branch passages 22 leading to the valved passages provided in the sprue bushings 24 of the cavity section of the mold. With the plungers or pins 41 associated with the sprue bushings 24 in their open or flow-permitting positions, the molten plastic may advance into the molding cavities 26 when the core extensions 27 of the core section 28 occupy their operative positions within said cavities, as shown more particularly in Fig. 2 of the drawings. The mold cavities are thus filled with the heated plastic material so that when said material cures, or cools and hardens, the articles will be formed.

The sprue section is formed, as usual, with a multiplicity of heating fluid-conducting passages 45. By means of these passages, heating fluid or the like may be circulated through said passages to maintain the plastic materials present in or traveling through the sprue passages in a molten state. Other passages 46 may be formed in the cavity section 9 for the circulation of a cooling fluid, obtained from any suitable source, whereby to conduct heat away from the cavity section and thereby shorten the time required for plastic articles to cure and solidify. Similar passages 47 may be provided in the core section of the mold for the circulation of a fluid coolant. Certain of the passages 47 are disposed, as shown in Fig. 2, axially of the core extensions 27 and are equipped with baffles 48 for directing the course of travel of the fluid coolant longitudinally of the extensions in an effective manner. The heating of the sprue section is accomplished in such manner that the plastic material contained therein is at all times maintained in a flowing formative state and is prevented from hardening. This flowable condition of the plastic is maintained up to the seats provided for the outer ends of the plungers or pins 41, so that when the latter are retracted, there will be no hardening of the plastic material in or adjacent to the plastic receiving ends of the bushings 24 and their passages 23.

It will be observed in the above described construction that the seating of the forward ends of the plungers or pins 41 in the bushings 24 seals or closes off the flow of heated plastic material and shears the latter material from any connection with the plastic articles formed in the cavities 26. Thus when the core section 27 is separated along its parting surface 49 from the cavity section 9 of the mold structure, the articles formed on the extensions 27 will be retained by the latter as shown in Fig. 3. These articles will be devoid of the usual sprue runners which are produced thereon by the operation of conventional molds. In the present invention, when the sprue runners are pinched off by the action of the plungers or pins 41, no trace of the sprue runners remains on the molded articles except for a very small protrusion, such as that indicated on the base of each article in Fig. 3. This protrusion may be readily removed without injury to the article or in many cases left thereon without any attempt being made to remove the same.

In the construction disclosed in Figs. 9 and 10, the plunger 41a is formed at its forward end with a valve extension 50 of reduced diameter as compared with that of the body of the valve plunger. When flow of the plastic takes place to the molding cavities, the plunger 41a occupies the position disclosed in Fig. 9. When in this position, the heated plastic passes through the passages 22 and thence into a chamber 51 formed in the forward end of a sleeve 52, the chamber 51 receiving the body of the plunger 41a and being substantially coextensive in length therewith. The forward end of the sleeve 52 is terminated in a frust-conical formation 53, which is adapted to occupy a correspondingly formed socket 54 formed in the cavity section 9 of the mold.

The valve plunger 41a terminates at the rear end thereof in a head 55, which is seated in a socket 56 formed axially in the headed end 57 of the sleeve 52. The end 57 of said sleeve, in turn, is positioned in a slot 38a formed in connection with the wedge element 34a.

When the wedge element is operated to retract the sleeve 52, in order to arrest plastic flow to the mold cavities 26, the body of said sleeve at the forward end thereof moves over the outlet of the communicating passage 22 and thereby arrests plastic flow in the manner shown in Fig. 10.

In Fig. 11, the pin or plunger 41b is provided with a forwardly disposed conical end 60 which is arranged to be seated in a conical orifice 61 formed in the mold section 9. In this form of my invention, the valve operates in the same manner as the valve shown at 41 in the preferred form of my invention. The pin 41a of Fig. 9 may be conductively or otherwise suitably heated to maintain the plastic material around the end 50 thereof in a molten or flowable state at all times, thus preventing hardening of the plastic and consequent stoppage of passage.

Such conductive heating is usually effected by the circulation of superheated steam or the like through the passages 45 of the stationary mold section 8. If desired, the movable die section 28 may be provided with the conventional dowel pins 61 which project beyond the forward face of the die section 28 for reception within tapering sockets 62 provided in the complemental face of the relatively stationary die section 9.

By referring to Fig. 14 of the drawings, it will be noted that the cylinder 39a, which controls the reciprocation of the wedge slides 34, may be provided with oppositely disposed fluid inlet-outlet ports 65. The latter are connected by way of conduits 66 with the first and second motor ports 66a and 66b, respectively, of a solenoid-actuated reversing valve 67.

The valve 67 is provided with a recpirocable spool-type valve member 68, the latter being selectively movable to establish communication between either of the motor ports 66a and 66b and a pressure inlet port 69, while connecting the opposite motor port with an exhaust port 70 disposed at the extreme end of the valve chamber. The valve member 68 extends outwardly through the valve casing at both ends, the same being connected at one end with an armature 71 of a solenoid S2, which, usually, is carried stationarily at one end of the valve casing. The opposite end of the valve member 68 terminates in an enlarged piston head or collar 72 which is slidable within a spring housing 73 carried on the opposite end of the valve casing.

The housing 73 contains a coil compression spring 74 which is interposed between the head 72 and the outer wall of the valve casing in a manner to urge the valve member 68 toward an extreme left hand position as viewed from Fig. 14. The member 68 is so arranged that upon energization of the solenoid S2, the member moves to an extreme right hand position, thus establishing communication between the fluid pressure inlet 69 of the valve and the motor port 66b communicating with the retracting area of the ram 39a. Upon energization of the solenoid S2, the wedge slides 34 are retracted, and thereby cause retraction of the valve plungers 41. Conversely, upon deenergization of the solenoid S2, the spring 74 serves to move the valve member 68 leftwardly to establish communication between the pressure inlet port 69 and the ram-advancing area of the ram 39a, thereby causing advancing movement of the valve plungers 41 into their seated positions with respect to the seats 43.

Reciprocating movement of the injection ram 3 is controlled advantageously by a second reversing valve 76 which is substantially identical in operation to the reversing valve 67, the valve 76 embodying a pair of motor ports 76a and 76b connected respectively with the ram-advancing and ram-retracting areas of the ram 3. A valve or spool member 77 is movable selectively to connect either of the motor ports with an inlet port 78 while connecting the opposite motor port with a branched exhaust conduit 79. In this instance, the valve member 77 is connected at one end with the armature of the solenoid S3 and at its opposite end with an enlarged head 80 which is biased by a coil compression spring 81, toward an extreme right hand position when viewed in Fig. 14. It will be understood that the rams 3 and 39a may be either hydraulically or pneumatically operated, and, accordingly, Fig. 14 illustrates operation of the ram 3 by hydraulic pressure, while operation of the ram 39a is accomplished by means of pneumatic pressure. The pressure inlet 78 of the valve 76 is connected by means of a conduit 82 with the outlet of a suitable hydraulic pump P, the latter having its inlet connected with a conduit 83 communicating with a reservoir 84. The branched exhaust conduit 79 for the valve 76 also communicates with the reservoir 84 to provide for the exhaust of hydraulic fluid from either of the oppositely disposed areas of the ram 3.

The solenoid S3 is shown as so arranged that upon energization the same moves the valve member 77 in a left hand direction. This establishes communication between the pressure inlet port 78 and the ram-advancing area of the ram 3. The spring 81 is arranged to move the valve member 77 in the opposite direction upon deenergization of the solenoid S3 to provide for retracting movement of the ram 3.

The die closing ram 6a extends within a pressure cylinder 6b which is stationarily mounted within or upon a stationary bolster 5a. The cylinder 6b and ram 6a comprise a double acting hydraulic motor, and fluid under pressure is supplied to or exhausted from the opposite ends of the motor by way of fluid inlet-outlet ports 90 and 91, the port 90 communicating with the ram advancing area of the cylinder 6b, while the port 91 communicates with the ram retracting area thereof. The respective ports 90 and 91 are connected with the opposite motor ports 92 and 93 of a third four-way reversing valve 94 which is substantially identical to the valves 67 and 76. The valve 94 is provided internally with a spool member 95 which is movable selectively to establish communication between a pressure inlet port 96 and either of the motor ports 92 or 93 while connecting the opposite motor port with a branched exhaust conduit 97. The valve member 95 is moved selectively in a right hand direction, as viewed from Fig. 14, upon energization of a solenoid S1 which is advantageously mounted on the valve casing at one end thereof and has its armature connected with the valve member 95. Upon deenergization of the solenoid S1, a coil compression spring 98 engaging the opposite end of the valve member 95 is effective to shift the valve member 95 toward an extreme left hand position to admit fluid pressure into the ram retracting area of the cylinder 6b.

In the operation of the present injection molding machine, it is desirable that movement of the valve plungers or pins 41 be controlled in synchronization with the movement of the injection ram 3 and the die closing ram 6a. Toward this end, Fig. 15, comprising a circuit diagram, discloses an automatic electrical circuit by which the desired movement of the components of the injection molding machine may be controlled. By reference to Fig. 15, it will be seen that the reference characters L1 and L2 designate the power lines of the electrical circuit. The power line L1 contains a by-pass switch circuit comprising a master switch MS and a normally closed limit switch LS2 which, as shown in Fig. 14, is positioned to be engaged and opened by the cam projection 86 carried on the main platen 6 when the latter occupies its fully retracted position. The limit switch LS2 is normally closed when the platen 6 occupies other than a fully retracted position. Connected between the power lines L1 and L2 is a timer switch T1 of the usual motor-driven wiping contact type and provided with secondary control terminals X1 and X2 which are connected in series between the lines L1 and L2 with the solenoid S1 which controls the valve 94. Also connected between the lines L1 and L2 in parallel with the timer switch T1, is a second timer switch T2 having the secondary control terminals Y1 and Y2 which are connected in series with the solenoids S2 and S3 controlling the valves 67 and 76 respectively. Also connected in series with the second timer switch T2 is a limit switch LS1 which, as shown in Fig. 14, is positioned to be engaged and closed by the cam projection 86 when the main platen 6 occupies its full die closing position. The limit switch LS1 is normally open when the platen 6 occupies other than its fully extended die closing position.

In operation, assuming the die closing ram 6a to be in a fully retracted condition with the various elements of the press at rest, an injection molding cycle is instituted by closing the master switch MS which establishes an operating circuit for the timer T1 which, in turn, upon energization, closes an energizing circuit for the solenoid S1 causing the valve 94 to direct fluid pressure into the advancing area of the cylinder 6b to thus move the ram 6a and platen 6 toward a die closing position. As the ram 6a advances, the cam projection 86 is disengaged from the limit switch LS2 in order that the same closes a by-passing circuit for the master switch MS maintaining the timer switch T1 in an energized condition. The timer switch T1 maintains the solenoid S1 energized as the ram 6a reaches its extreme die closing position and the cam projection 86 engages and closes the limit switch LS1. Upon closure of the limit switch LS1, the second timer switch T2 is energized which, in turn, closes an energization circuit for the solenoids S2 and S3. Energization of the solenoids S2 and S3 conditions the valves 67 and 76 to introduce pressure fluid simultaneously within the retraction area of the ram 39a to withdraw the pins 41, and within the ram advancing area of the injection ram 3. Thus, the plungers or pins 41 are withdrawn from their seated positions by retraction of the wedge shoes 34 and the injection ram 3 is advanced forwardly of the injection chamber 2 to force plastic material from the chamber into the die cavities. The timer switch T2 is so set that the circuit for the solenoids S2 and S3 will remain energized for a period commensurate with the full injection stroke of the ram 3, and immediately following the injection stroke, the timer T2 deenergizes the solenoids S2 and S3 to reverse the valves 67 and 76 and thereby simultaneously cause the motor 39a to advance the pins 41 into their seated positions, while retracting the injection ram 3 to thus displace runner-forming plastic material within the sprue openings 23 of the stationary die member. The pins 41 remain in their seated or extended positions so long as the solenoid S2 is deenergized, and following a predetermined dwell period, commensurate with the curing time of the particular plastic article being formed, the timer switch T1 deenergizes the circuit for the solenoid S1, thereby reversing the valve 94 and instituting a retracting stroke of the ram 6a. As the ram 6a starts in its retracting stroke, the limit switch LS1 is disengaged by the projection 86 to automatically deenergize the timer switch T2 whereupon the same is reset automatically upon deenergization to condition the switch for a subsequent cycle. Likewise, as the ram 6a continues in its retracting stroke, the cam projection 86 overrides the limit switch LS2 to open the latter and deenergize the entire operating circuit permitting the timer switch T1 to automatically reset itself for a subsequent operating cycle, and to permit the parts of the press to come to rest in an open position. It will here be understood that the timer switches T1 and T2 are of the type commonly employed in connection with injection molding machines and other automatically operable apparatus, and function to control a secondary circuit to cause energization or deenergization of the secondary circuit for a predetermined and selected time, the same being reset by internal spring means upon deenergization. It will also be manifest that the various hydraulic pump systems embodies in the present injection molding machine are of the ordinary type appropriately providing for holding pressures within the rams 3 and 6a as the same reach extreme end positions.

In view of the foregoing, it will be seen that the present invention provides an efficient positively acting injection molding machine which embodies means, in the form of the clean-out plungers or pins 41 for removing undesired sprue runners from the ends of plastic articles molded within the machine, and that such means is rendered responsive automatically to the operation of the remaining component parts of the injection molding machine.

While I have shown and described what I now consider to be preferred embodiments of my invention, nevertheless it will be understood that such embodiments are subject to variation or modification as to details of construction without departing from the spirit of the invention or the scope of the following claims.

I claim:

1. In an injection molding machine; a die having a molding surface and passage means through which plastic materials may be forcibly passed to said molding surface; said passage means terminating in a discharge orifice at said molding surface and embodying a plurality of relatively angularly disposed branches; injection means for forcing plastic material through said passage means toward the discharge orifice thereof; a sprue cut-off pin movably mounted in said die in axially spaced relation to said injection means and having an outer end, said pin normally extending into said passage means in axial alignment with but in spaced relation to the discharge orifice thereof; and means independent of said injection means for moving said pin in the general direction of flow of plastic material toward said discharge orifice and to a position at which said pin closes the orifice of said passage means and is disposed in substantially flush relation to said molding surface.

2. The combination defined in claim 1, wherein said last-named means comprises a wedge-shaped head secured to said pin at the end thereof opposite said outer end; a slidable wedge bar mounted in said die in perpendicular relation to said pin and engaging said head, said wedge bar being movable to impart axial reciprocation to said pin; and fluid pressure-responsive means connected with said wedge bar for moving the latter.

3. In an injection molding machine; a die having a molding surface and passage means composed of a plurality of angularly related branches and terminating at one end in a relatively restricted discharge orifice opening at said molding surface; injection means communicating with said passage means at the end thereof opposite said discharge orifice and operative to force plastic material through said passage means toward the discharge orifice thereof; an elongated sprue cut-off pin movably mounted in said die in axially offset relation to said injection means and having an outer end portion intersecting said passage means and normally occupying a first position in axially aligned but spaced relation to said discharge orifice, said pin being movable within said die in the direction of flow of plastic material toward said discharge orifice to a second position at which the outer end of said pin closes said discharge orifice and is disposed in substantially flush relation to the molding surface of said die; and means independent of said injection means for moving said pin between said first and second positions.

References Cited in the file of this patent

UNITED STATES PATENTS

| Number | Name | Date |
|---|---|---|
| 2,227,263 | Knowles | Dec. 31, 1940 |
| 2,254,233 | Meyer | Sept. 2, 1941 |
| 2,298,716 | Moreland et al. | Oct. 13, 1942 |
| 2,303,288 | Lester | Nov. 24, 1942 |
| 2,316,298 | Strunk | Apr. 13, 1943 |
| 2,410,324 | Windsor et al. | Oct. 29, 1946 |
| 2,449,133 | Lyijynen | Sept. 14, 1948 |
| 2,461,723 | Cowan | Feb. 15, 1949 |
| 2,470,402 | Jobst | May 17, 1949 |
| 2,471,148 | Gale et al. | May 24, 1949 |
| 2,494,777 | Patterson et al. | Jan. 17, 1950 |
| 2,570,613 | Vinal | Oct. 9, 1951 |
| 2,613,395 | Massler | Oct. 14, 1952 |

FOREIGN PATENTS

| Number | Country | Date |
|---|---|---|
| 606,331 | Great Britain | Aug. 11, 1948 |